Nov. 9, 1937.  C. G. STRANDLUND  2,098,472
PLOW
Filed May 22, 1935  3 Sheets-Sheet 2
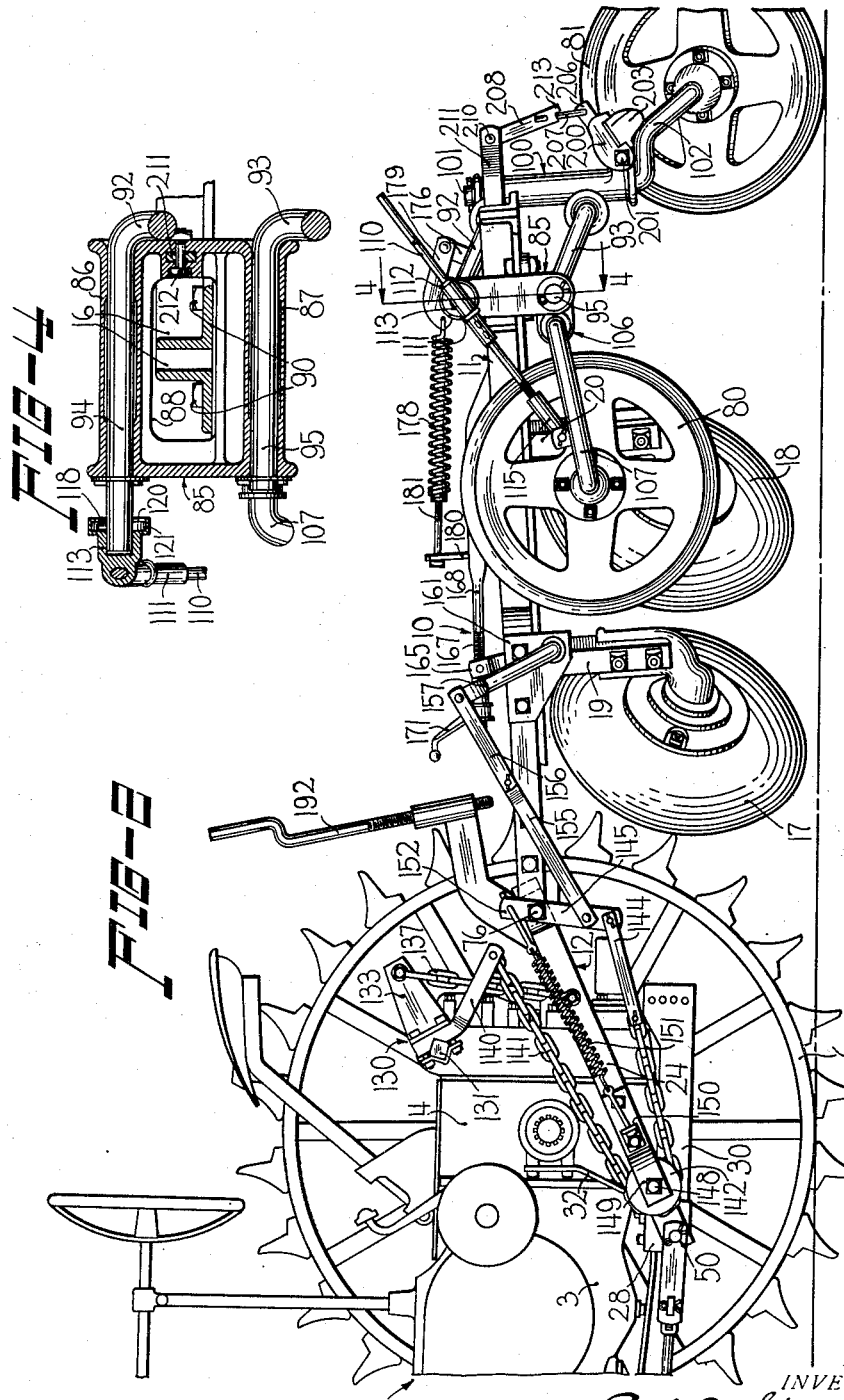
INVENTOR
Carl G. Strandlund
BY
Brown, Jackson, Boettcher & Drenner
ATTORNEYS.

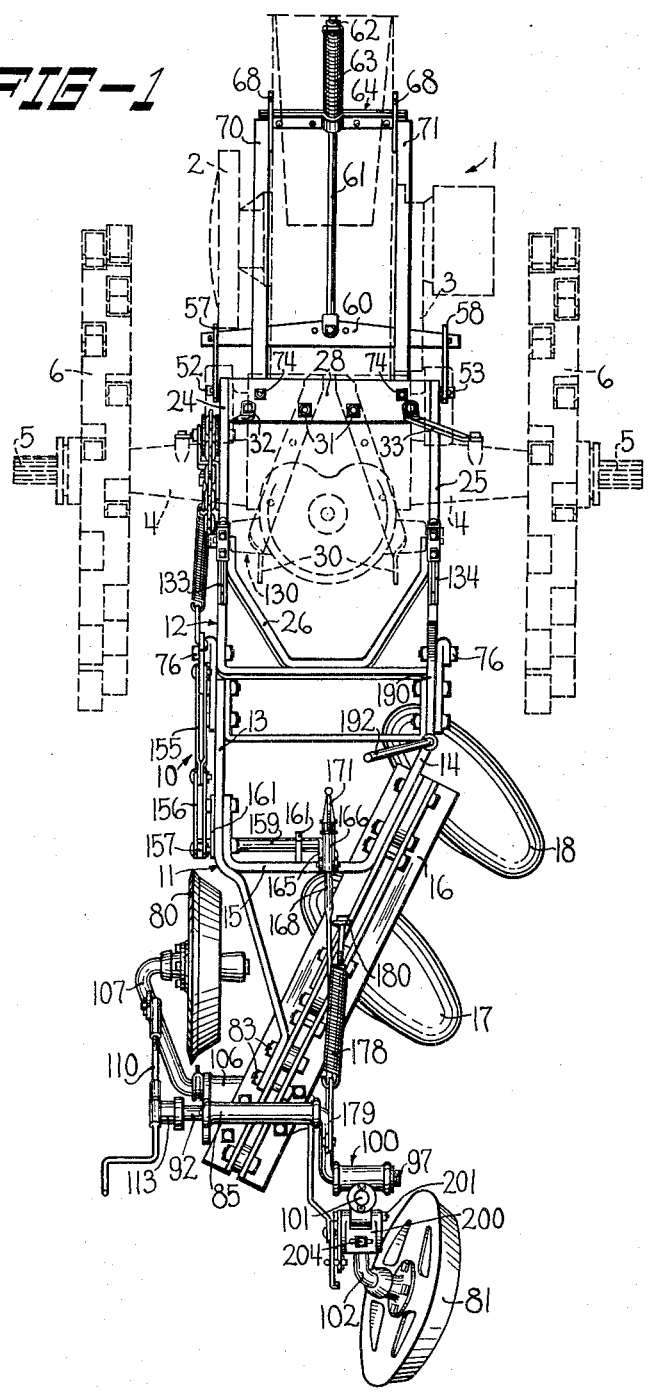

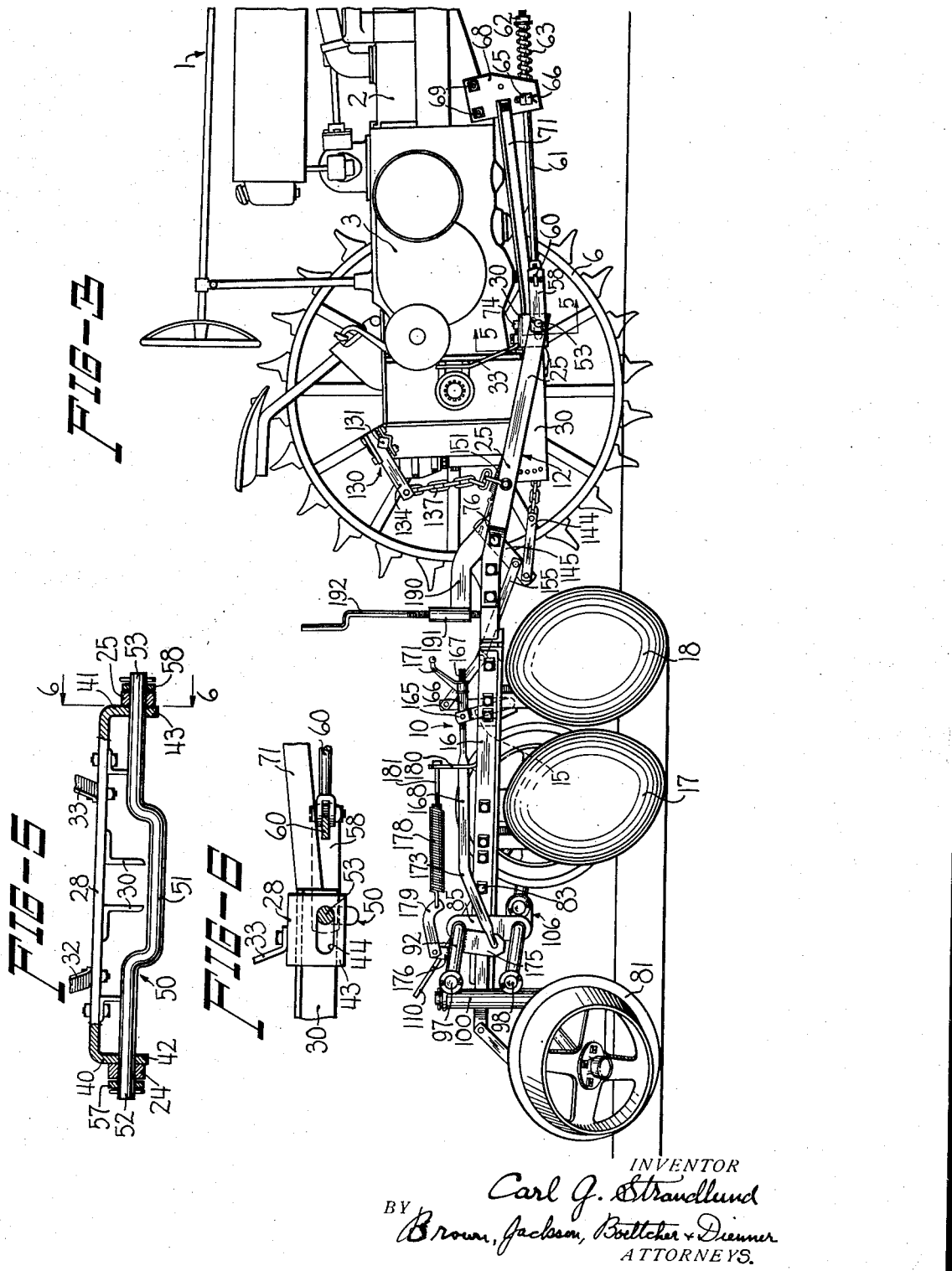

Patented Nov. 9, 1937

2,098,472

UNITED STATES PATENT OFFICE 2,098,472

PLOW

Carl G. Strandlund, Moline, Ill., assignor to Deere & Company, Moline, Ill., a corporation of Illinois Application May 22, 1935, Serial No. 22,677

32 Claims. (Cl. 97—47)

The present invention relates generally to agricultural implements, and more particularly to implements of the type supported at one end on a propelling unit, such as a tractor, and at the other end on supporting wheel means.

The principal object of the present invention is the provision of new and improved frame means for implements of the aforesaid type. Specifically, an object of the present invention is the provision of means serving as a draft frame pivotally connected with the tractor and with the implement frame to provide for raising and lowering the latter and, in addition, so connected with the tractor as to accommodate a limited amount of lateral swinging, but, at the same time, acting to prevent any lateral tilting of the implement unit.

A further object of the present invention is the provision of new and improved raising and lowering means whereby the implement frame may be easily and conveniently moved into and out of transport position, and a further object of the present invention in this connection is the provision of improved means associated with the lifting connections so that variations in the position of the implement unit with respect to the tractor, as may occur when the machine traverses rough and uneven ground, will not materially affect the position of the implement frame when it is in its operating position.

Still further, another object of the present invention is the provision of an implement connected at its front ends with a propelling tractor at laterally spaced points and supported at its rear end on a gauge wheel and a caster wheel, and in which the gauge wheel is moved into and out of ground engaging position when the implement frame is moved into and out of its operating position.

A further object of the present invention is the provision of improved locking means serving to prevent the caster wheel from castering when the implement frame and the gauge wheel are in their working position.

These and other objects of the present invention will be apparent to those skilled in the art after a consideration of the following detailed description of the preferred structural embodiment of the invention, taken in conjunction with the accompanying drawings illustrating such embodiment.

In the drawings:

Figure 1 is a top plan view of a disc plow embodying the principles of the present invention, the supporting and propelling tractor being indicated in dotted lines;

Figure 2 is a side view of the machine shown in Figure 1 with the furrow openers raised into transport position and showing the left side of the disc plow with the left-hand drive wheel of tractor removed;

Figure 3 is a view similar to Figure 2 but showing the other side of the plow when it is in operating position;

Figure 4 is a fragmentary section taken on an enlarged scale along the line 4—4 of Figure 2;

Figure 5 is a section taken along the line 5—5 of Figure 3; and

Figure 6 is a section taken along the line 6—6 of Figure 5.

Referring now more particularly to Figure 1, the tractor is indicated in its entirety by the reference numeral 1 and is of more or less conventional construction, embodying a motor 2 including a combined frame and transmission housing 3 and associated axle housing sections 4 which enclose the axle shafts 5 on which the traction wheels 6 are mounted.

The agricultural implement is indicated in its entirety by the reference numeral 10 and comprises an implement frame 11 and means serving as a draft frame 12 connecting the forward ends of the laterally spaced frame bars 13 and 14, constituting the principal portion of the implement frame 11, with the tractor 1 at laterally spaced points. The rear end of the frame bar 14 is bent laterally to form a reenforcing cross bar 15 which is bolted to the frame bar 13, as best shown in Figure 1. A tool beam 16 also forms a part of the implement frame 11 and serves as a support for a pair of furrow openers 17 and 18 in the form of discs connected with the beam 16 by means of standards 19 and 20 of more or less conventional construction. The rear end of the implement frame 11 is supported on wheel means which will be described later, and the front end of the frame 11 is supported on the draft frame 12 which, in turn, is carried by the tractor.

The draft frame 12, like the implement frame 11, also includes two laterally spaced frame bar sections 24 and 25, being braced and reenforced by a bent bar 26, best shown in Figure 1. A transverse plate member 28 is arranged to be supported directly on the tractor, and to this end the tractor carries a pair of forwardly converging angle members 30 which are secured to the under portion of the axle housing, bolt means 31 serving to connect the transverse plate member 28 therewith. Upwardly extending brace means 32 and 33 are bolted at their lower ends to the plate member 28 and, at their upper ends, are bolted to suitable lugs or the like on the forward side of the axle housing sections 4. The laterally directed end portions 40 and 41 (Figure 5) of the plate member 28 terminate in downturned portions 42 and 43 which are slotted, as at 44 (Figure 6). A transversely disposed draft member 50, having an intermediate section 51 formed to clear the lower edges of the supporting angles 30, has laterally directed ends 52 and 53 disposed in and extending laterally of the slotted portions 42 and 43 of the transverse plate 28. By virtue of the slots 44, the member 50 is capable of limited movement in a generally horizontal plane relative to the tractor. The forward ends of the laterally spaced draft frame bars 24 and 25 (Figure 1) are apertured to receive the laterally directed ends 52 and 53 of the transverse member 50 so as to receive draft therefrom, and, extending forwardly from the ends 52 and 53, are links 57 and 58 to the forward ends of which an evener bar 60 is connected. Draft is applied to the bar 60 by means of a centrally disposed link 61 having its forward end threaded and receiving a nut 62 which bears against a cushioning compression spring 63, as best shown in Figure 1. The cushioning spring 63 reacts against bracket means 64 in the form of a pair of strap members 65 and 66 (Figure 3) having their intermediate portions bent to accommodate the centrally disposed draft rod 61 and their laterally outer ends carried in brackets 68 securely bolted, as at 69, to the frame of the tractor. The bracket means 65, 66, 68 is braced by a pair of angle members 70 and 71 which extend rearwardly from the plates 68 to the transversely disposed member 28, being bolted to the latter, as at 74.

By virtue of the above construction, when the tractor 1 moves forwardly, draft is applied through the spring 63 and rod 61 to the evener bar 60, and from the latter the draft force is applied to the frame 12 through the links 57 and 58 and the transversely disposed member 50 to the laterally outer ends of which the bars 24 and 25 of the draft frame are connected. Draft applied to the latter is transmitted through the pivot bolts 76, which pivotally connect the implement frame 11 with the draft frame 12, to the front end of the implement frame. By virtue of the pivot connection between the rear end of the draft link 61 and the bar 60 and the limited swinging movement of which the transverse member 50 is capable, lateral deviations of the implement 10 are accommodated, but any lateral tipping of the implement is resisted by the draft frame 12 reacting against the tractor at the laterally spaced ends 52 and 53 of the transverse member 50. Of course, if convenient, the draft link 61 could be connected directly to the central portion of the member 50, in which case the evener bar 60 and the links 57 and 58 would not be required.

The rear end of the implement 10 is supported, when in working position, upon a land or gauge wheel 80 and a rear furrow wheel 81, the latter being positioned directly behind the rear furrow opener 17 as best shown in Figure 1. The beam 16 and the implement frame bar 13 converge rearwardly and are connected together by bolts 83. At this end of the implement frame a vertically disposed casting 85 is fastened. The casting 85 includes upper and lower journal sections 86 and 87 (Figure 4) and a central opening 88 arranged to receive the rear ends of the angles constituting the beam 16, the casting 85 being bolted to their horizontal flanges by bolts 90. Parallel crank members 92 and 93 have their axle portions 94 and 95 mounted for rocking movement in the upper and lower journal portions 86 and 87, and the crank portions 97 and 98 (Figure 3) thereof receive and are supported on a generally vertically disposed sleeve casting 100 in which the spindle section 101 of the caster wheel axle 102 is disposed. The casting 85 is also provided with a forwardly disposed horizontal journal portion 106 which receives one end of the axle 107 upon which the gauge wheel 80 is carried, as best shown in Figures 1 and 2.

The position of the gauge wheel relative to the implement frame 11 is controlled by means of an adjusting crank 110 which is anchored by collars 111 and 112 in a swivel socket 113 carried by one end of the axle portion 94 of the upper parallel link 92. The lower end of the adjusting crank 110 is threaded into a pivoted socket 115 carried by the crank axle 107. The swivel socket 113 is held on the end of the axle section 94 by virtue of a construction embodying a pin 118 (Figure 4) fixed to the axle section 94 and adapted to be passed through a slot 120 into an internally grooved section 121 formed on the socket 113. In its normal position the slot 120 is opposite the pin 118 so that in assembling the device the crank 110, disconnected from the threaded socket 115, is reversed from the position shown in Figure 2, which permits the pin 118 to pass through the slot 120. Then the crank 110 may be turned into its normal position and threaded into the socket 115. This brings the pin 118 into the closed portion of the groove 121, as best shown in Figure 4.

The plow is raised and lowered by raising and lowering both ends of the implement frame 11, the front end being raised by swinging the draft frame 12 upwardly and the rear end being raised by swinging the parallel links 92 and 93 upwardly about their pivotal support on the spindle sleeve member 100. According to the principles of the present invention, both ends of the implement frame 11 are raised and lowered at the same time, and preferably the power for performing this operation is taken from the tractor. The tractor 1 is provided with a power lift of more or less conventional construction, indicated in its entirety by the reference numeral 130, and is of the type embodying a transversely disposed lifting shaft mounted for rocking movement adjacent the rear of the tractor and operated by the power of the tractor motor 2. The present invention contemplates mounting a pair of arms 133 and 134, shown respectively in Figures 2 and 3, directly on the lifting rock shaft 131 and connected, respectively, to the draft frame bars 24 and 25 by any form of connecting means, such as chains 137. If desired, either or both of these connections may be made adjustable for length. The chains 137 are connected with the draft frame 12 at points adjacent the rear end thereof, and when the rock shaft 131 is actuated to swing the arms 133 and 134 upwardly from the position shown in Figure 3 to the position shown in Figure 2, the draft frame 12 is swung upwardly about its connection with the transverse member 50. This raises the forward end of the implement frame 11 which is pivotally connected with the rear end of the draft frame 12 by the pivot bolts 76.

The rear end of the implement frame 11 is raised simultaneously with the forward end by suitable connections also actuated by the lifting rock shaft 131. These connections include a third arm 140 secured in any desired manner to one end of the rock shaft 131 and connected by means of a chain 141 passing around a pulley 142, fastened to the draft frame 12 adjacent the pivot axis defined by the transverse member 50, and connected by a link 144 with a lever 145 that is pivotally mounted on the left-hand pivot bolt 76. The pulley or sheave 142 may be mounted in any desired manner, but preferably it is journaled on a pin or bolt 148 carried by the draft frame member 24 and by a strap member 149 secured to the draft frame bar 24 and having an end 150 to which a spring 151 is connected, the rear end of the spring 151 being connected to the upper end 152 of the lever 145 at a point above the axis defined by the pivot bolt 76. The lever 145 is connected by a pair of links 155 and 156 with the upper end of an arm 157 carried by or forming a part of an intermediate rock shaft 159 (Figure 1) which is journaled in brackets 161 secured to the central portion of the implement frame 11. As best shown in Figure 1, each of the links 155 and 156 is made up of a pair of straps disposed, respectively, on opposite sides of the lever 145 and the arm 157.

The inner end of the rock shaft 159 carries an arm 165, and mounted by trunnions on the arm 165 is a sleeve member 166 which receives the threaded end 167 of longitudinally extending link 168. An adjusting crank 171 is threaded onto the end 167 of the link 168 and bears against the sleeve 166 for adjusting the effective length of the link 168. The rear end of the latter is bent downwardly, as at 173, and is pivotally connected with the lower end of an arm 175 permanently secured, as by welding, to the upper parallel link 92, as best shown in Figure 3. A bracket 176 is also welded to the parallel link 92. If desired, the bracket 176 and the arm 175 may be formed in one piece, welded or otherwise secured to the parallel link 92. An assisting spring 178 is connected with the bracket 176 through a longitudinally extending link 179, and the forward end of this spring 178 is connected to a standard 180 by means of an adjusting bolt 181. The standard 180 is preferably carried by the furrow opener beam 16, as best shown in Figure 1, the lower end of the standard 180 extending horizontally and being attached to the beam 16 by one of the bolts which fixes the rear furrow opener standard 20 to the plow beam 16.

In operation, whenever the lifting shaft 131 is actuated in a clockwise direction, as viewed in Figure 3, the chains 137 will lift the draft frame 12 to the position shown in Figure 2, and at the same time will exert a pull on the chain 141 to swing the lever 145 in a counter-clockwise direction toward the position shown in Figure 2. This exerts a pull on the links 155 and 156 which rocks the arms 157 and 165 forwardly, and rocking the arm 165 forwardly from the position shown in Figure 3 to the position shown in Figure 2 causes the link 168 to exert a pull on the arm 175 and rock the parallel links in a counter-clockwise direction as viewed in Figure 3 about their pivotal support on the spindle sleeve 100 and, acting through the vertical casting 85, to raise the rear end of the implement frame 11 at the same time that the front end is raised by the vertical swinging movement of the draft frame 12 occasioned by the upward swinging movement of the arms 133 and 134. When it is desired to lower the implement frame 11 to cause the furrow openers 17 and 18 to enter the ground, the lifting rock shaft 131 is permitted to move in the other direction, clockwise as viewed in Figure 2 and counter-clockwise as viewed in Figure 3. This relaxes the pull on the chain 141 and links 155 and 156, and the arms 157 and 165 on the rock shaft 159 then swing rearwardly until the arm 165 engages the frame cross bar 15 which thereby serves as a stop for limiting the downward movement of the rear end of the implement frame. As the frame 11 moves toward its lowered position and the furrow openers 17 and 18 enter the ground, the gauge wheel 80, which moves vertically with the implement frame, comes into operation and serves to prevent the furrow openers from operating too deep. As will be apparent from Figure 2, however, when the implement frame 11 is raised, the gauge wheel 80 is out of engagement with the ground.

One of the advantages of an implement in which the frame is connected with the propelling tractor at two laterally spaced points and supported, especially when in transport position, at the rear end by a caster wheel, the gauge wheel being out of ground-engaging position, is that the machine may be conveniently and easily backed. For example, in Figure 2 it will be apparent that when the machine is backed, the caster wheel 81 may swing around toward the front of the implement in accommodating any steering movement of the tractor when backing. It will also be noted that in this position the gauge wheel 80 is disposed sufficiently forwardly and the frame casting 85 sufficiently high so as to clear the rear furrow wheel 81 when the latter swings around to the other side of the pivot axis 101 when backing.

When the lifting shaft 131 has been rocked into its lower position and the plow lowered into operating position, the chains 137 are slack so that any vertical movement of the plow relative to the tractor, or vice versa, will not affect the depth of operation of the tools 17 and 18. The spring 151 serves to keep the chain 141 taut, thus permitting the links 155 and 156 to slacken, as best shown in Figure 3. Since the chains 137 are slack, they cannot function to hold the pivotally mounted draft frame in position. Accordingly, the right hand draft frame bar 25 carries an extension 190 which is disposed rearwardly of the axis defined by the pivot bolts 76 and terminates in a generally vertically disposed threaded sleeve portion 191 which receives an adjusting crank 192. The lower end of the crank 192 is arranged to engage the top edge of the right hand implement frame bar 14 to limit the downward pivotal movement between the implement frame and the draft frame. The implement and draft frames then pivot as a unit about the pin 50 as an axis as the machine traverses uneven ground. The adjusting crank 192 also serves to level the implement frame, being disposed on the side thereof opposite the gauge wheel 80, and the spring 178 aids somewhat in forcing the furrow openers 17 and 18 into the ground.

When the plow is in operation and the gauge wheel 80 running on the land, the rear furrow wheel 81 is relied upon in opposing the tendency for the discs 17 and 18 to run landwardly, and since the wheel 81 is disposed rearwardly of the vertical pivot 101, some means must be provided to prevent the furrow wheel from castering when the implement frame is lowered. However, when the implement frame is raised and the gauge wheel 80 is out of ground-engaging position, it is necessary that the rear wheel 81 be arranged to caster, for the forward end of the implement frame is connected with the propelling tractor 1 at laterally spaced points. When in lowered position, the rear furrow wheel 81 is prevented from castering by an axle lock comprising a casting 200 pivotally mounted by a bolt 201 to the lower end of the spindle sleeve 100, as best shown in Figure 2. An axle engaging yoke section 203 (Figure 2) is adjustably mounted in a slot 204 (Figure 1) formed in the casting 200, the position of the yoke 203 in the slot 204 determining the amount of lead for the rear furrow wheel 81. An arm 206 is carried on the casting member 200 and a link 207 is pivotally connected to the arm 206 and to the lower end of a link 208, the latter being pivotally connected, as at 210, to a rearwardly extending bracket 211 securely fixed by a bolt 212 in a socket formed in the vertical frame casting 85 (Figure 4). The lower end of the link 208 carries a laterally directed lug 213 disposed to one side of the link 207 so as to prevent the links 207 and 208 from moving into a locked position or from swinging forwardly when the implement frame 11 is lowered. The length of the links 207 and 208 is such that when the implement frame is raised to the position shown in Figure 2, the caster lock is disengaged from the axle 102 so that the wheel 81 is free to caster, but when the implement frame 11 is lowered into operating position, the yoke section 203 of the caster lock engages the axle 102 of the wheel 81 and holds the same rigidly against any lateral swinging, as best shown in Figure 1. The links 207 and 208, being pivotally connected together, accommodate adjustment in the vertical position of the implement frame 11 relative to the spindle sleeve 100 without disturbing the position of the caster lock 200.

As mentioned above, when the plow is in operative position the lifting chain 137 and the links 155 and 156 are slack, as shown in Figure 3. The entire weight of the implement is then supported upon the wheels 80 and 81 at the rear and the pin 50 at the forward end. At such time the lower end of crank screw 192 bears upon frame member 14 and the plow as a whole pivots about the pin 50 when wheels 80 and 81 follow undulations in the ground surface. At this time the arm 140, to which chain 141 is connected, is disposed in a position about 60° measured clockwise from the position shown in Figure 2. The links 155 and 156 have collapsed and the lever 145 is rotated in a counterclockwise direction under the influence of spring 154 to hold chain 141 taut. The position of the rear wheel 81 with respect to the frame of the plow is fixed by the arm 165 bearing against frame member 15. By reason of the fact that the chain 141 is trained over sheave 142, which is disposed adjacent the pin 50, pivoting of the plow upon pin 50 as the wheels 80 and 81 follow undulations in the ground surface does not materially affect the connections between the lever 140 and the arm 157. That is, the links 155 and 156 remain in a collapsed position irrespective of whether the wheels 80 and 81 rise or fall with respect to the tractor.

While I have shown and described above the preferred structure in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:—

1. A tractor plow comprising an implement frame, means serving as a draft frame connected with said implement frame and adapted to be connected with the tractor for vertical swinging about generally horizontal axes to provide for raising and lowering one end of the plow, supporting wheel means for the other end of the plow and connected with the implement frame for generally vertical shifting movement, and means carried by the tractor for swinging said draft frame and shifting the implement frame relative to said supporting wheel means for raising and lowering the plow.

2. A tractor plow comprising means serving as a draft frame adapted to be connected with the rear of the tractor at laterally spaced points for vertical swinging movement about a generally horizontal axis, an implement frame pivotally connected with the rear end of said draft frame for relative vertical swinging movement and including a diagonally disposed tool beam and a plurality of furrow openers secured thereto, supporting wheel means for the rear end of said implement frame disposed substantially directly behind the rear furrow opener and connected with said implement frame for substantially vertical movement with respect thereto, means carried by the tractor for raising and lowering said draft frame to raise and lower the forward end of the implement frame, and means reacting against the implement frame for raising and lowering the rear end of the implement frame relative to said supporting wheel means.

3. A tractor plow comprising an implement frame, means serving as a draft frame for connecting the implement frame with the tractor, said draft frame means being connected with the implement frame and adapted to be connected with the tractor for vertical swinging movement about generally transverse axes, means carried by the tractor for swinging said draft frame means vertically, thereby providing for raising and lowering one end of the plow, supporting wheel means for the other end of the plow connected with the implement frame for generally vertical shifting movement, and means interconnected with the means for swinging said draft frame means for shifting the implement frame relative to said supporting wheel means for raising and lowering the rear end of the plow simultaneously with the raising and lowering of the front end thereof.

4. A tractor plow comprising a plow frame including laterally spaced frame members, a draft frame adapted to be connected with the tractor at laterally spaced points, means pivotally connecting the forward ends of said frame members with said draft frame for relative swinging movement between the draft frame and the implement frame about a generally transverse axis to provide for raising and lowering the forward end of the plow frame, supporting wheel means for the rear end of the plow frame operatively connected therewith for generally vertical movement with respect thereto, means on the tractor for swinging said draft frame, and means interconnected with said draft frame swinging means and including a part movable about the points at which said draft frame is connected with the tractor for shifting the plow frame relative to said supporting wheel means for raising and lowering the rear end of the plow.

5. An agricultural implement adapted to be propelled by a wheeled tractor and comprising an implement frame, supporting wheel means for the rear end of the frame, a transversely disposed draft transmitting member, means pivotally connecting the front end of said frame therewith at laterally spaced points, means connecting said member with the tractor to receive draft therefrom and providing for limited swinging movement in a horizontal plane to accommodate lateral deviations of the implement frame and to prevent lateral tilting of said frame, and means for limiting the swinging movement of said member relative to the tractor sufficient to prevent the implement from colliding with the wheels of the tractor.

6. An agricultural implement adapted to be propelled by a tractor comprising an implement frame, supporting wheel means for the rear end of the frame, means serving as a draft frame pivotally connected with the forward end of said implement frame at laterally spaced points, a transverse member adapted to be secured to the tractor and having slotted end portions, means disposed in the slots of said portions for operatively connecting the draft frame with the tractor, and draft transmitting means connected with the ends of said last mentioned means.

7. An agricultural implement adapted to be propelled by a tractor and comprising an implement frame, ground engaging supporting means for the rear end of the frame, a transverse plate member adapted to be secured to the tractor and having slotted end portions, a transverse member disposed in and extending laterally of said slotted end portions, means serving as a draft frame having forwardly disposed portions connected to the extended ends of said transverse member and rearwardly extending laterally spaced portions pivotally connected with said implement frame, and draft transmitting means including an evener bar connected at its ends with the extended ends of said transverse member and pivotally connected at its intermediate portions with the tractor to receive draft therefrom, said evener bar and said slotted portions accommodating limited lateral deviations of the draft and implement frames.

8. An agricultural implement adapted to be propelled by a tractor and including an implement frame having laterally spaced generally forwardly extending frame members, a transverse plate member adapted to be fixed to the tractor and including angularly bent end portions provided with slots therein, a transverse member movably mounted in said slots and including end portions extending outwardly therefrom, means connecting the laterally spaced forwardly extending frame members with the extended ends, respectively, of said transverse member, an evener bar link-connected with said extended ends, and means for transmitting draft from the tractor to said bar including bracket means carried by the tractor and a spring-cushioned link member pivotally connected with the intermediate portion of said evener bar.

9. An agricultural implement adapted to be propelled by a tractor and comprising an implement frame, ground engaging supporting means disposed at the rear end of said frame, means serving as a draft frame adapted to be pivotally connected with the tractor, means pivotally connecting the forward portions of said implement frame with the rear portions of said draft frame, and means carried by said draft frame in substantially rigid relationship and extending rearwardly of said pivotal connection means for engagement with a portion of the implement frame to limit the downwardly swinging movement of the draft frame, whereby the weight of the front end of the implement frame is supported at the point of pivotal connection between the draft frame means and the tractor.

10. An agricultural implement adapted to be propelled by a tractor and comprising an implement frame, ground engaging supporting means for the rear end of said implement frame, means supporting the forward end of said implement frame on the tractor including a draft frame having laterally spaced generally longitudinally extending bars pivotally connected at the forward ends with the tractor, the implement frame including laterally spaced generally forwardly extending frame bars pivotally connected with said laterally spaced bars of the draft frame, one of said latter bars extending rearwardly of the pivotal connection with the implement frame, and a crank screw carried by said extended end and adapted to engage the associated implement frame bar for limiting the relative swinging movement between the draft frame and the implement frame in one direction.

11. An agricultural implement comprising an implement frame including laterally spaced generally longitudinally extending frame bars, ground engaging supporting means connected with the rear ends of said frame bars, means for supporting the forward end of said implement frame including a draft frame having generally longitudinally extending frame bars pivotally connected with the forward ends of said implement frame bars, and means for leveling the implement frame including an extension carried by one of said draft frame bars and adjustable means carried by said extension and engaging the forward portion of one of said implement frame bars.

12. An agricultural implement adapted to be propelled by a tractor and including an implement frame comprising rearwardly converging frame bars spaced apart at their forward ends, means serving as a draft frame including laterally spaced members pivotally connected with the forward ends of the implement frame bars and adapted to be pivotally connected for vertical swinging movement with the tractor, ground engaging supporting means carried at the rear end of said implement frame bars and including wheel means having a vertical spindle on which the implement frame is adjustable, means adapted to be carried by the tractor for raising and lowering the draft frame means, and means reacting against said implement frame for raising and lowering the rear end thereof with respect to said wheel spindle.

13. An agricultural implement adapted to be propelled by a tractor and including an implement frame comprising rearwardly converging frame bars spaced apart at their forward ends, means serving as a draft frame including laterally spaced members pivotally connected with the forward ends of the implement frame bars and adapted to be pivotally connected for vertical swinging movement with the tractor, ground engaging supporting means carried at the rear end of said implement frame bars and including wheel means having a vertical spindle on which the implement frame is adjustable, means adapted to be carried by the tractor for raising and lowering the draft frame means, and means actuated by said last mentioned means and reacting against the draft frame substantially at the point of its pivotal connection with the tractor for raising and lowering the rear end of said implement frame on said spindle.

14. A tractor plow comprising an implement frame, means serving as a draft frame pivotally connected with said implement frame and adapted to be pivotally connected with the tractor for vertical swinging about generally horizontal axes to provide for raising and lowering the front end of the plow, supporting wheel means for the rear end of the plow and connected with the implement frame for relative vertical movement, means reacting against the tractor for raising the draft frame to raise the front end of the implement frame, and means connected with said raising means for raising the rear end of the implement frame relative to said supporting wheel means to arrange the plow for transport, the means for raising the rear end of the implement frame including a part operable closely adjacent to one of said axes whereby the position of the rear end of the plow is not affected by movement of said implement frame about said one axis.

15. A tractor plow comprising an implement frame, means serving as a draft frame pivotally connected with said implement frame and adapted to be pivotally connected with the tractor for vertical swinging about generally horizontal axes to provide for raising and lowering the front end of the plow, supporting wheel means for the rear end of the plow, means including parallel links for movably connecting the rear end of the plow with said wheel means, a lever operatively connected to swing said parallel links for raising and lowering the rear end of the plow relative to said wheel means, a rock shaft mounted on the implement frame, means operatively connecting said rock shaft with said lever, and means carried by the tractor and operatively connected with said draft frame and said rock shaft for raising and lowering said plow.

16. A plow comprising a tool beam supported at its front end for vertical swinging movement about a generally transverse axis, a frame member fixed to the rear end of said beam, a rear land wheel and a rear furrow wheel connected with said frame member for supporting the rear of the plow when in operating position, a ground working tool carried by said beam, and means for raising said beam and said land wheel into transport position, whereby the rear end of the plow is supported only by said rear furrow wheel.

17. A plow comprising a tool beam supported at its front end for vertical movement about a generally transverse axis, a frame casting fixed to the rear end of said beam, a land wheel and castering furrow wheel operatively connected with said frame casting for supporting the rear of the plow when in operating position, tool means carried by said beam, means for raising the front and rear ends of said beam to transport position, and means associated therewith for holding the furrow wheel against castering when the plow is in working position.

18. An agricultural implement adapted to be propelled by the tractor and comprising an implement frame adapted to be pivotally connected with the tractor at laterally spaced points for generally vertical swinging movement, supporting wheel means for the rear end of said implement frame including a caster wheel and a non-castering gauge wheel, tool means carried by said implement frame and controlled as to depth of operation by said gauge wheel, and means cooperating with the tractor and said caster wheel for raising the implement frame and said gauge wheel into transport position.

19. An implement comprising a frame, means including a caster wheel for supporting said frame, means for raising and lowering said frame relative to said caster wheel, a lock for holding the wheel against castering when the implement frame is in lowered position, and link means connected between said frame and said lock for shifting the latter to release said caster wheel when the frame is raised.

20. An agricultural implement including a frame comprising a pair of generally longitudinally converging frame members, a vertically disposed frame casting receiving said frame members and having upper and lower horizontal journal sections, a generally vertically disposed sleeve casting including a spindle receiving section, a caster wheel having a vertical spindle disposed in said last named section for lateral swinging movement, parallel link means connecting said sleeve casting with said frame casting and including parts disposed in said upper and lower journal sections, means carried by the frame and reacting against one of said parallel link members for raising the frame relative to the caster wheel, a lock for the caster wheel adapted to be raised into inoperative position when said frame is raised, and gauge wheel means carried by said frame and including a crank axle connected with said frame casting and adjusting means connected between the crank axle and one of said parallel link members.

21. An agricultural implement adapted to be propelled by a tractor comprising an implement frame, supporting wheel means for the rear end of the frame, means serving as a draft frame pivotally connected with the forward end of said implement frame, a transverse member adapted to be secured to the tractor and having slotted end portions, a member disposed in the slots of said portions and connected with the forward end of said draft frame, and draft transmitting means connected between the tractor and said last named member.

22. An agricultural implement adapted to be propelled by a tractor and comprising an implement frame, ground engaging supporting means for the rear end of said implement frame, the implement frame including laterally spaced generally forwardly extending frame bars, draft transmitting means connected between the tractor and said implement frame and including an evener bar connected at its ends with the laterally spaced forwardly extending bars of the implement frame, and means acting between said tractor and the evener bar limiting the swinging movement of the latter and preventing said implement from swinging into the tractor.

23. An agricultural implement adapted to be propelled by a tractor and comprising an implement frame, ground engaging supporting means for the rear end of said implement frame, means supporting the forward end of said implement frame on the tractor including a draft frame having laterally spaced generally longitudinally extending bars pivotally connected at the forward ends with the tractor, the implement frame including laterally spaced generally forwardly extending frame bars pivotally connected with said laterally spaced bars of the draft frame, one of said latter bars extending rearwardly of the pivotal connection with the implement frame, and means carried by said extended end and connected with the associated implement frame bar for limiting the relative swinging movement between the draft frame and the implement frame in one direction.

24. An agricultural implement adapted to be propelled by a tractor and including an implement frame pivotally connected with the tractor for vertical swinging movement about a pivotal axis, front and rear supporting means for said frame, means on the tractor for adjusting one of said supporting means, and mechanism interconnected with said adjusting means for adjusting the position of the other supporting means and including a part movable adjacent the axis of pivotal connection between the implement frame and the tractor so that oscillations of the implement frame relative to the tractor will not affect said other adjusting means.

25. An agricultural implement adapted to be propelled by a tractor and including an implement frame pivotally connected with the tractor for vertical swinging movement about a pivotal axis and including adjustable supporting means, and mechanism for adjusting the position of the latter relative to the supporting means including a part on the tractor, a part on the frame, and means movable adjacent the axis of pivotal connection between the implement frame and the tractor so that oscillations of the implement frame relative to the tractor will not affect the position of said supporting means relative to the frame.

26. A plow comprising a movably supported tool beam, a frame member fixed to said beam, a land wheel and a furrow wheel connected with said frame member for supporting at least a portion of the plow when in operating position, a ground working tool carried by said beam, and means for raising said beam and said land wheel into transport position, whereby the rear end of the plow is supported only by said furrow wheel.

27. An agricultural implement including a frame comprising a pair of generally longitudinally disposed frame members, a vertically disposed frame casting receiving said frame members and having upper and lower horizontal journal sections, a generally vertically disposed sleeve casting including a spindle receiving section, a caster wheel having a vertical spindle disposed in said last named section for lateral swinging movement, means movably connecting said sleeve casting with said frame casting and including parts disposed in said upper and lower journal sections, means carried by the frame and reacting against said last named means for raising the frame relative to the caster wheel, and a lock for the caster wheel carried by said sleeve casting adapted to be raised into inoperative position when said frame is raised.

28. An agricultural implement adapted to be propelled by a tractor and comprising an implement frame, supporting wheel means for the rear end of the frame, a transversely disposed draft transmitting member, means pivotally connecting the front end of said frame therewith at laterally spaced points, means for transmitting draft from the tractor to said member, and means engageable with the ends of said member for limiting the lateral swinging of the latter.

29. In a tractor plow, the combination with a tractor of an implement frame extending rearwardly behind the tractor, means serving as a draft-transmitting frame pivotally connected between the tractor and the implement frame and serving as the sole support for the front end of the latter, means on the tractor for raising and lowering the rear portion of said draft frame means, and ground engaging means at the rear end of said implement frame serving as the sole support for that end of the implement frame.

30. In a tractor plow, the combination with a tractor of an implement frame extending rearwardly behind the tractor and including laterally spaced longitudinally extending bars and a diagonally extending tool beam connected therewith, means serving as a draft-transmitting frame pivotally connected between the tractor and the front ends of the laterally spaced bars of said implement frame and serving as the sole support for the front end of the latter, means on the tractor for raising and lowering the rear portion of said draft frame means, a casting connected with the rear end of said diagonal beam and having a generally vertically disposed sleeve, a rear furrow wheel having a spindle journaled in said sleeve, and means for shifting said beam relative to said spindle for raising and lowering the rear end of said implement frame.

31. The combination with a tractor, of an agricultural machine having a frame, means at one end of said frame pivotally connecting the frame with the tractor for free vertical swinging movement, ground engaging supporting means at the other end of said frame, and means on the tractor and extending closely adjacent the pivot axis at said one end of the frame for raising and lowering the other end of said frame relative to said ground engaging supporting means, whereby vertical swinging movement of the implement frame about said axis will not affect the position of the implement frame relative to said ground engaging supporting means.

32. The combination with a tractor, of an agricultural machine having a frame means at one end of said frame pivotally connecting the frame with the tractor for free vertical swinging movement, ground engaging supporting means at the other end of said frame, means serving as a lever fulcrumed on said implement frame and reacting against said ground engaging supporting means for raising and lowering that end of the implement frame, a part movable on the tractor, and means connecting said part with said lever means and including a flexible element passing adjacent said axis, whereby vertical swinging movement of the implement frame about said axis will not affect the position of the implement frame relative to said ground engaging supporting means.

CARL G. STRANDLUND.